United States Patent [19]
Cooper

[11] Patent Number: 5,771,448
[45] Date of Patent: Jun. 23, 1998

[54] BATTERY PACK HAVING PERSONALITY DATA STORED THEREIN

[75] Inventor: Gerald Meade Cooper, Gretna, Va.

[73] Assignee: Ericsson Inc., Research Triangle Park, N.C.

[21] Appl. No.: 494,421

[22] Filed: Jun. 26, 1995

[51] Int. Cl.[6] ........................................ H04Q 7/32
[52] U.S. Cl. .................. 455/411; 455/572; 455/575; 455/343
[58] Field of Search .................. 455/89, 90, 88, 455/127, 343, 575, 573, 411, 558, 572, 557

[56] References Cited

U.S. PATENT DOCUMENTS

| | | | |
|---|---|---|---|
| 4,455,523 | 6/1984 | Koenck | 320/43 |
| 4,593,409 | 6/1986 | Miller | 455/73 |
| 4,876,552 | 10/1989 | Zakman | 343/702 |
| 5,077,832 | 12/1991 | Szczutkowski et al. | 455/89 |
| 5,153,906 | 10/1992 | Akiyama | 379/112 |
| 5,248,929 | 9/1993 | Burke | 320/48 |
| 5,257,414 | 10/1993 | Trahan et al. | 455/90 |
| 5,301,360 | 4/1994 | Goldberg | 455/89 |
| 5,349,535 | 9/1994 | Gupta | 364/483 |
| 5,379,404 | 1/1995 | Rasor | 395/500 |
| 5,404,580 | 4/1995 | Simpson et al. | 455/89 |
| 5,446,783 | 8/1995 | May | 455/343 |
| 5,517,683 | 5/1996 | Collett et al. | 455/89 |

FOREIGN PATENT DOCUMENTS

| | | | |
|---|---|---|---|
| 0599244 | 11/1993 | European Pat. Off. | H04B 1/38 |
| 0622935 | 4/1994 | European Pat. Off. | H04M 1/72 |
| 2251515 | 1/1991 | United Kingdom | H01M 10/48 |

*Primary Examiner*—Chi H. Pham

[57] ABSTRACT

A system and method for storing personality relating to a communication device and the users thereof is disclosed involving an interchangeable battery pack for each user to power the communication device. Each battery pack includes a programmable memory device having the personality data stored therein and circuit means for transmitting the personality data to and from the programmable memory device.

30 Claims, 5 Drawing Sheets

BATTERY PACK HAVING PERSONALITY DATA STORED THEREIN

BACKGROUND OF THE INVENTION

1. Field of the Invention

The present invention relates to a system and method for storing personality data of radio transceivers and users thereof and, more particularly, to a battery pack containing a programmable memory device for storing such personality data which is detachable from the radio transceiver.

2. Description of Related Art

Radio systems employed by public safety officials such as police and fire departments, as well as private security forces, preferably are configured to permit communication between several radio transceivers and a central control station. Due to the substance and nature of such communications, the radio system must be secure from interference by third parties. One manner in which such radio systems provide secure communications is through verification of certain personality data assigned to a particular radio transceiver and/or a particular user thereof. Personality data, as defined herein, relates to information which is specific to the radio system involved, any radio transceiver which is a part of the radio system, and any authorized user of a radio transceiver. Because the communications within the radio system are only as secure as the personality data utilized therewith, several types of systems and mechanisms have been employed to protect such personality data.

For example, a code plug approach has been utilized in which a plug-in module containing the personality data is attached to the outside housing of a radio transceiver or is installed within the housing of the radio transceiver (see U.S. Pat. No. 5,379,404 to Rasor). While such a code plug approach is able to perform the intended function, it has had the undesirable effects of either increasing the overall size of the radio transceiver or requiring at least partial disassembly thereof. In either case, it has been found that the weatherproofness of the radio transceiver can be diminished, as well as wear and tear on the radio transceiver increased.

Similarly, a programmable memory device dedicated to the storage of personality data may be positioned within the radio transceiver circuitry, as disclosed in U.S. Pat. No. 5,077,832 to Szczutkowski. As seen therein, a programmable memory device is coupled to a microprocessor so the microprocessor is able to write personality data to the memory device as well as read personality data therefrom. This arrangement also permits reprogramming of personality data in the programmable memory device by an external UDC connector, which eliminates the need to open the radio transceiver for replacing the memory chip or microprocessor chip to upgrade the program code.

A situation commonly faced by radio systems is that a single radio transceiver must be utilized by several different users, as necessitated by shift changes or the like. Additionally, personality data of the radio transceiver may need to be edited when the radio transceiver is utilized within several different groups of users or in several different defined areas, a particular user travels to a site other than his normally defined area, or new radio transceivers are put into use. Therefore, the personality data associated with a particular radio transceiver and/or a user thereof will need to be reprogrammed constantly, which has been accomplished in one of two ways. First, the radio transceiver may be taken to a central programming station where a computer is connected thereto by means of a program connector and the personality data is written therein. This first approach to reprogramming personality data can cause delays when many radio transceivers simultaneous need reprogramming, as the number of programming stations are usually limited by cost considerations. A second approach is to reprogram the personality data over-the-air. However, the interface utilized therefor typically will not support data rates comparable to those obtained from a direct connection to a programming station or computer. Moreover, the reprogramming may be delayed or compromised by noisy over-the-air signalling and is not available when the radio transceiver has been moved out of range of the original radio system.

In light of the foregoing, it would be desirable for a system and method to be developed in which personality data for a radio transceiver can be stored without affecting the durability and performance of the radio transceiver. It would also be desirable for this system and method to minimize the need for reprogramming of the personality data and thereby substantially reduce the inconvenience associated with programming stations and over-the-air reprogramming.

Accordingly, it is an object of the present invention to provide a system and method for storing personality data independent of a radio transceiver's internal circuitry.

A further object of the present invention is to provide a system and method for storing personality data of a radio transceiver and/or a user thereof in a manner which does not affect the overall size of the radio transceiver.

It is another object of the present invention to provide an apparatus and method of storing personality data in a programmable memory device which enables the personality data to be written into and read from such programmable memory device.

Yet another object of the present invention is to provide a system and method for storing personality data which minimizes the need for reprogramming.

Another object of the present invention is to provide an apparatus and method for storing personality data which does not affect the durability or weatherproofness of a radio transceiver.

Still another object of the present invention is to provide a system and method for storing personality data which enables more efficient sharing of a radio transceiver by several users.

Another object of the present invention is to provide an apparatus and method for storing personality data without requiring extraneous devices to be attached to or embedded in the radio transceiver.

These objectives and other features of the present invention will become more readily apparent upon reference to the following description when taken in conjunction with the following drawing.

SUMMARY OF THE INVENTION

In accordance with one aspect of the present invention, a system for storing personality data relating to a digitally controlled radio transceiver and the users thereof is disclosed which involves an interchangeable battery pack for each user to power the radio transceiver. Each interchangeable battery pack includes a programmable memory device having the personality data stored therein and circuit means for transmitting the personality data to and from the programmable memory device.

In accordance with a second aspect of the present invention, a battery pack for powering a radio transceiver is disclosed as including a battery enclosure, an electrical battery, a programmable memory device for storing personality data therein, and circuit means for transmitting the personality data to and from the programmable memory device, wherein the electrical battery, the programmable memory device, and the circuit means are all housed in the battery enclosure. The circuit means is preferably comprised of a serial clock line and a serial data line, wherein the personality data is able to be transmitted through the serial data line when synchronized with the serial clock line. A is plurality of electrical contacts are also connected to the circuit means and the electrical battery, where the electrical contacts have a surface terminating along an outer surface of the battery enclosure so that personality data is able to be transmitted to and from the circuit means and power is able to be transferred from the electrical battery.

In accordance with a third aspect of the present invention, a digitally controlled radio transceiver is disclosed including a housing defining an interior space and outer surface. A battery pack is attached to the housing outer surface, with the battery pack including a battery enclosure, an electrical battery, a programmable memory device for storing personality data therein, and circuit means for transmitting the personality data to and from the programmable memory device, wherein the electrical battery, the programmable memory device, and the circuit means are all housed in the battery enclosure. RF circuitry is disposed in the housing interior space for generating modulated RF signals for transmission and receiving RF signals for demodulation, as is a microprocessor for operating the RF circuitry. The microprocessor includes circuit means for transmitting and receiving the personality data, wherein the circuit means of the microprocessor and the circuit means of the programmable memory device are connected so that personality data is able to be transmitted between the microprocessor and the programmable memory device. The microprocessor is able to both write personality data to the programmable memory device and read personality data from the programmable memory device. Either the transceiver or the battery pack includes a programmer connector associated with the microprocessor or programmable memory device, respectively, wherein the personality data is able to be written into or read from the microprocessor or programmable memory device by an external computer. The circuit means of the microprocessor and the programmable memory device includes a common serial data line and serial clock line which are connected so that personality data may be transmitted over the serial data line when synchronized with the serial clock line. Both the housing outer surface of the transceiver and the battery enclosure of the battery pack include a plurality of electrical contacts in abutting relation so that the electrical battery can power the radio transceiver and the serial data line and the serial clock line can transmit personality data between the microprocessor and the programmable memory device.

In an alternative embodiment of the third aspect of the invention, a separate programmable memory device is also located in the radio transceiver housing interior space and connected to the microprocessor. Accordingly, a portion of the personality data may be stored in the transceiver programmable memory device and a portion of the personality data may be stored in the battery pack programmable memory device.

In accordance with a fourth aspect of the present invention, a method of storing personality data relating to a digitally controlled radio transceiver and users thereof involves the steps of providing an interchangeable battery pack for powering the transceiver, incorporating a programmable memory device into each battery pack along with circuit means for transmitting the personality data to and from the programmable memory device, and storing the personality data in the programmable memory device. The step of storing personality data in the programmable memory device involves either writing the personality data from an external computer to the radio transceiver and thereafter from the radio transceiver to the programmable memory device in the battery pack or directly from an external computer to the programmable memory device in the battery pack.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE DRAWING

Figure 1:
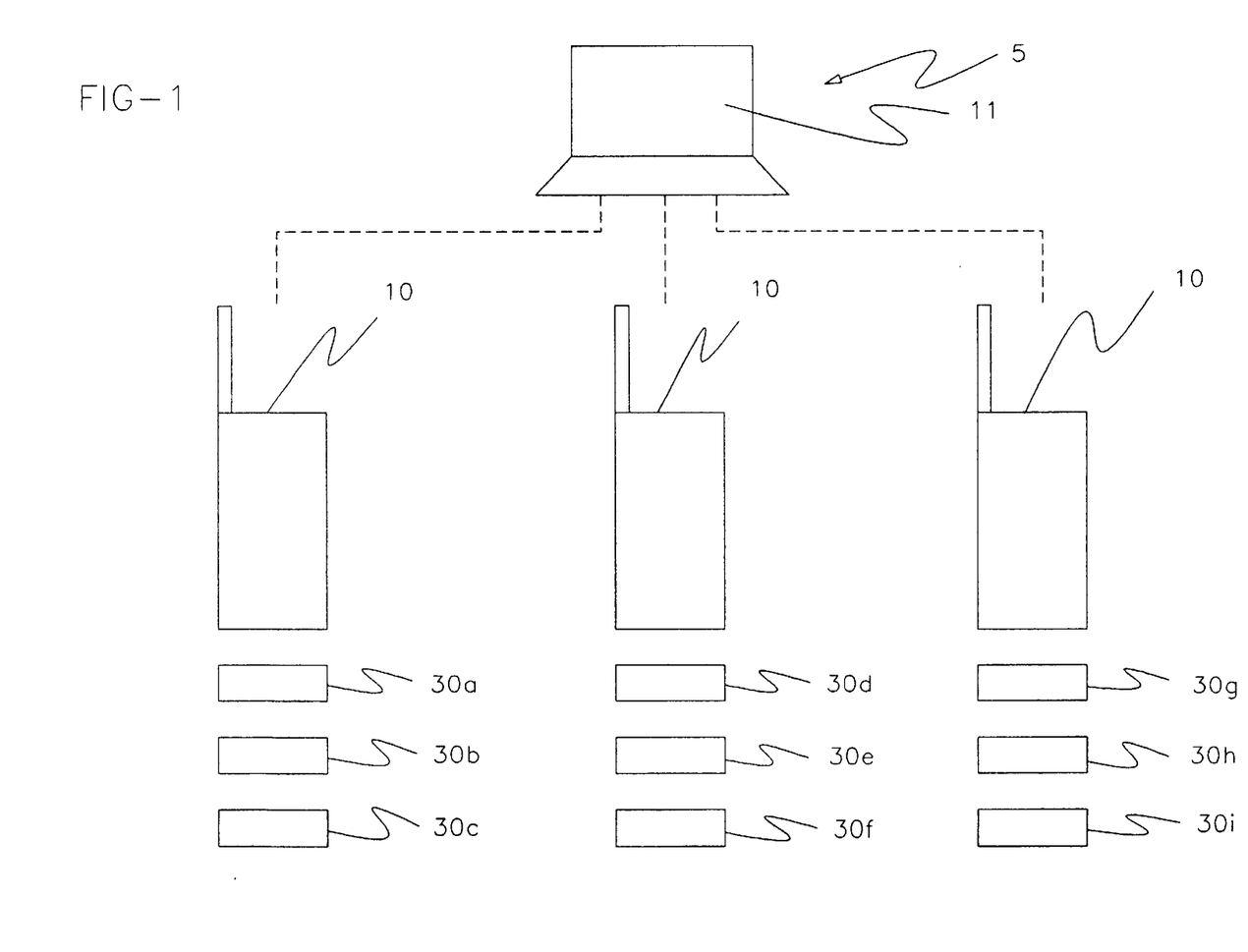
FIG. 1 is a diagrammatic depiction of a radio system having a plurality of radio transceivers and a central control station in accordance with the present invention.

Referring now to the drawing in detail, wherein identical numerals indicate the same elements throughout the figures, FIG. 1 depicts a radio system 5 having a plurality of multi-frequency radio transceivers 10 and a central control station 11. It will be understood that radio system 5 is of the type providing secure communications between each radio transceiver 10 and control station 11, as well as between certain radio transceivers. Preferably, radio system 5 operates at certain specified frequencies and has the ability to permit communication at designated levels depending on call type or other criteria. An example of such a radio system is the Enhanced Digital Access Communication system (EDACS) by Ericsson Inc., which is also the assignee of the present invention.

Figure 2:
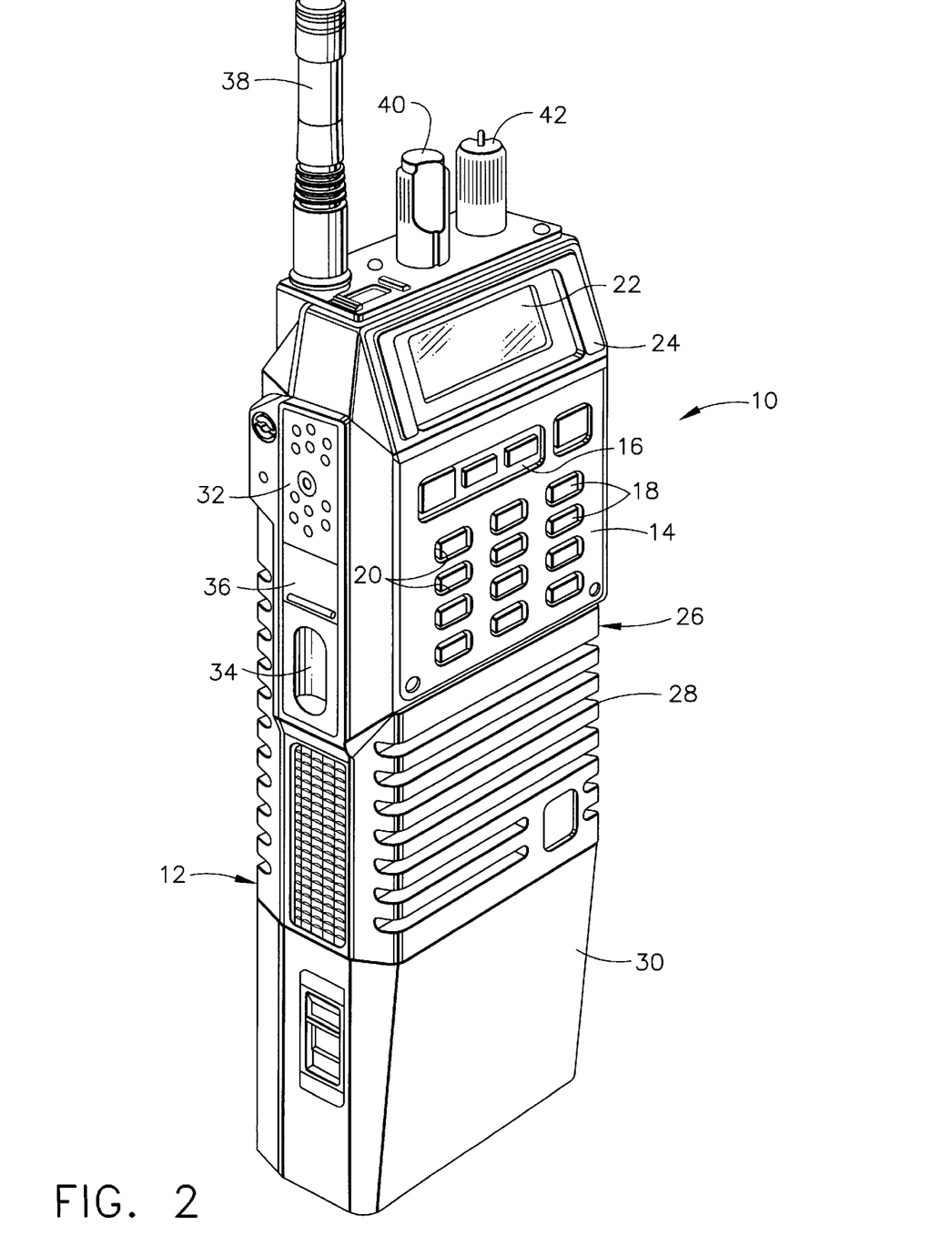
FIG. 2 is a perspective view of a radio transceiver unit shown in FIG. 1 which includes a battery pack having a programmable memory device therein for storing personality data.

More specifically, as seen in FIG. 2, each radio transceiver unit 10 includes a metal housing 12 (preferably aluminum) which has a front control panel 14 overlying a DTMF rubber keypad 16. Keypad 16 has a number of individual keys 18 which are shown projecting through a corresponding plurality of apertures 20 in control panel 14. A display board (or module) 22 is mounted within an upper portion of housing 12 for viewing messages, channel names, status indicators, etc. A display escutcheon plate 24 is also secured to a front cover 26 of housing 12. A speaker grill 28 (which overlies a speaker and microphone not shown) is incorporated into housing 12 directly below control panel 14. A battery pack 30 is operatively attached to the lower portion of housing 12 and is easily connected/disconnected for replacement as required. Other features and/or components include a programmer connector 32, a transmit button 34, monitor button 36, antenna 38, volume control knob 40, and frequency selector knob 42.

As disclosed in U.S. Pat. No. 5,077,832 to Szczutkowski et al., which is commonly owned by the assignee of the present invention and hereby incorporated by reference, transceiver 10 includes conventional microprocessor based digital and digitally controlled circuitry for generating modulated RF signals for radiation by antenna 38 and for receiving and demodulating RF signals received by antenna 38. A conventional frequency synthesizer circuit (not shown) internal to transceiver 10 determines the RF transmit and receive frequencies under control of digital signals produced by an internal microprocessor 50. Push-To-Talk (PTT) switch 34 controls the transmit/receive mode of transceiver 10, while display 22 displays channel, status, and other information. In the transceiver configuration shown in FIG. 2, the user may further control the functions of radio transceiver 10 by depressing one or more keys 18 provided on front panel 13. As mentioned previously, on/off control and volume controls are controlled by knob 40, while a further knob 42 can be operated to control RF channel selection by microprocessor 50.

Figure 3:
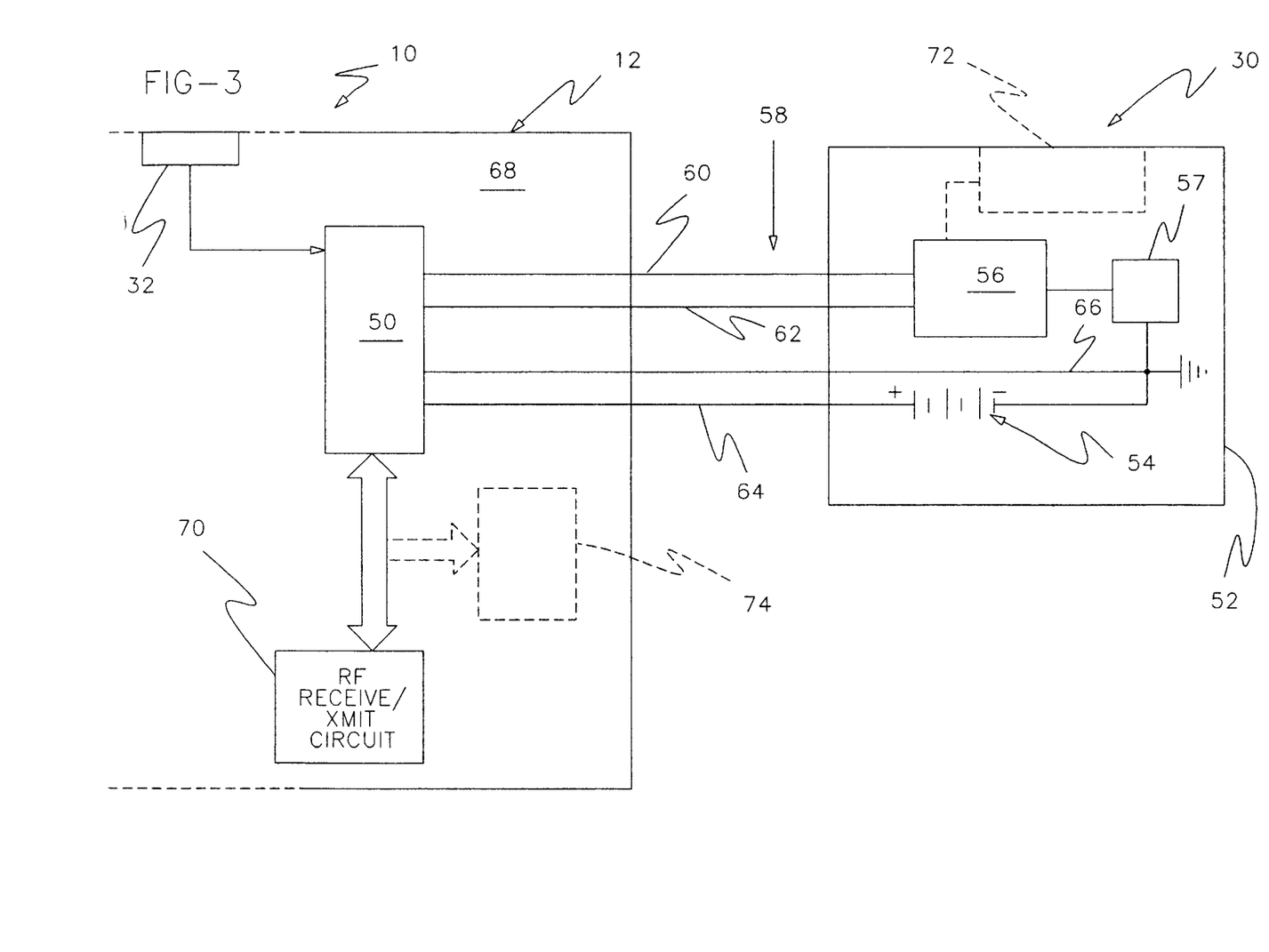
FIG. 3 is a schematic diagram of the interface between the radio transceiver and battery pack depicted in FIG. 2.

FIG. 3 is a schematic diagram depicting the interface between battery pack 30 and radio transceiver 10. It will be seen therein that battery pack 30 includes a battery enclosure 52, an electrical battery 54, and a programmable memory device 56 for storing personality data of radio system 5, radio transceiver 10, and/or a user thereof. It will be understood that programmable memory device 56 preferably is an EPROM, EEPROM, or other similar non-volatile programmable or reprogrammable memory device such as the 24C16 manufactured by Xicor Corporation of Milpipas, Calif. which has 2048 bytes of storage. Circuit means, designated generally by the numeral 58, is utilized for transmitting personality data between microprocessor 50 and programmable memory device 56. More specifically, circuit means 58 is a common serial data line 60 and a serial clock line 62, which are depicted separately for ease of understanding (however, a single line having the ability to perform the functions of both may be utilized). It will be understood that personality data, preferably in the form of hex data, may be transmitted through serial data line 60 when synchronized with serial clock line 62. It will also be noted that electrical battery 54, programmable memory device 56, and circuit means 58 for transmitting personality data to and from programmable memory device 56 are all contained or housed within battery pack enclosure 52.

Due to the connection of serial data line 60 and serial clock line 62 between microprocessor 50 and programmable memory device 56, radio transceiver 10 is able to both write personality data to programmable memory device 56 and read (or copy) personality data from programmable memory device 56.

Figure 5:
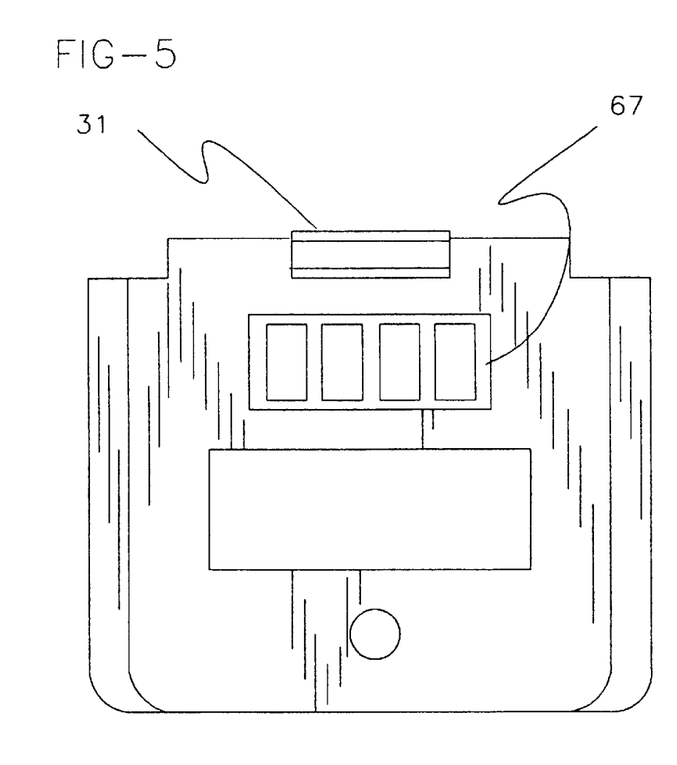
FIG. 5 is a front view of the battery pack depicted in FIG. 4.

It will also be seen from FIG. 3 that battery pack 30 is able to power radio transceiver 10 through separate voltage and ground lines 64 and 66, respectively. Voltage line 64, ground line 66, serial data line 60, and serial clock line 62 are all completed by means of respective electrical contacts for radio transceiver 10 and battery pack 30 (electrical contacts 65 of battery pack 30 being shown in FIGS. 5 and 6), which are brought into abutting relationship when battery pack 30 is properly attached to housing 12 of radio transceiver 10. Preferably, means for attaching battery pack 32 to transceiver housing 12, such as a latch 31 (see FIG. 5), is provided which enables battery pack 30 to also be detached easily therefrom.

Figure 6:
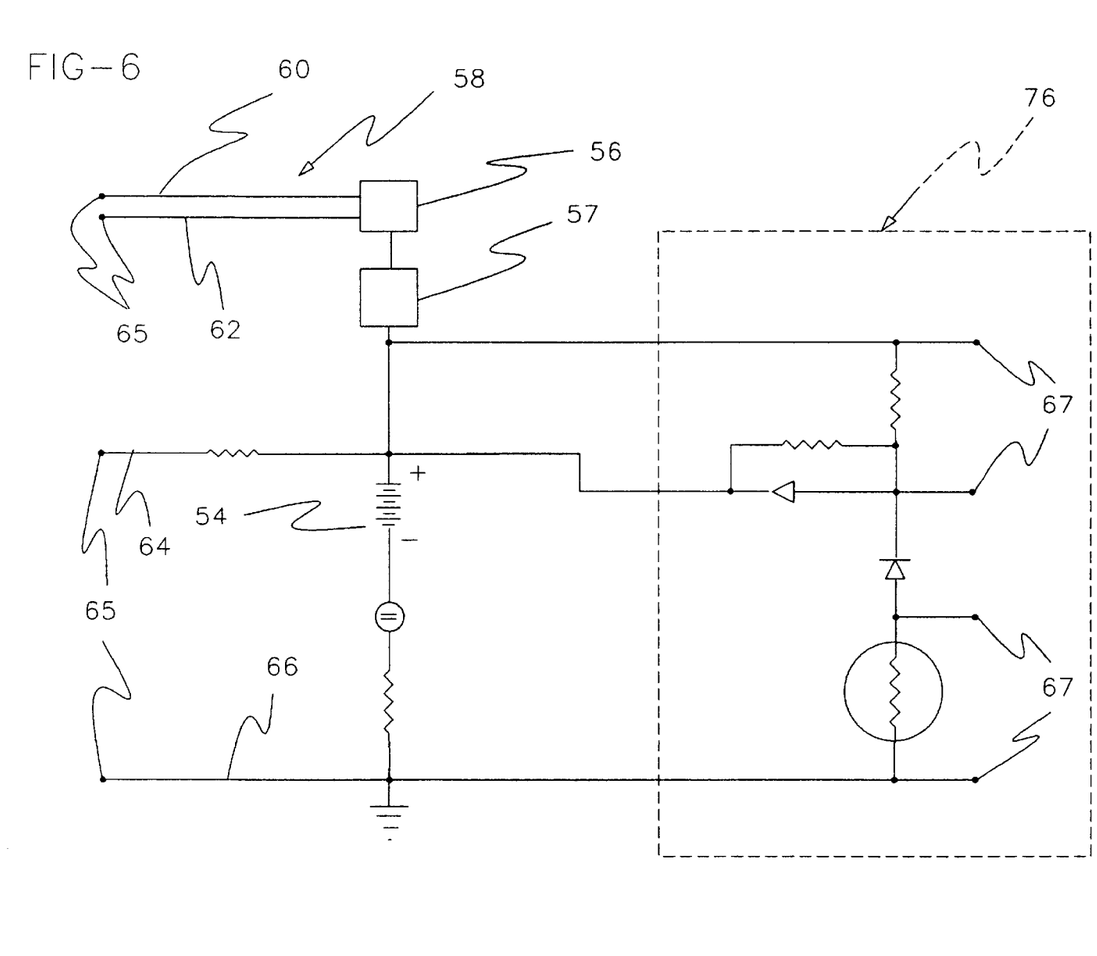
FIG. 6 is a circuit diagram of the battery pack depicted in FIGS. 2–5.

It should be noted that if programmable memory device 56 receives its supply voltage directly from battery 54, without first going through the radio transceiver circuitry, a mechanism should be provided to switch the power off and avoid depletion of electrical battery 54 while radio transceiver 10 is turned off. This can be accomplished by a voltage regulator 57 as shown in FIG. 6. Should programmable memory device 56 receive its supply voltage from radio transceiver 10, no such mechanism is necessary. In this instance, programmable memory device 56 could derive its power supply from serial clock and data lines 60 and 62. An example of such a programmable memory device is a ROM made by Dallas Semiconductor of Dallas, Tex. having the designation DS2401, which has a one-wire interface that supplies a bidirectional data path from which the operative current is supplied.

As seen in FIG. 3, microprocessor 50 is disposed in an interior space 68 defined by housing 12, where it is utilized to operate RF circuitry designated generally by the numeral 70. RF circuitry 70, as is well known, has the function of generating modulated RF signals for transmission and for receiving RF signals for demodulation. Other circuitry required for the operation of radio transceiver is not depicted herein, but reference is made to U.S. Pat. No. 5,077,832 for exemplary components.

In addition, program connector 32 associated with transceiver housing 12 is connected to microprocessor 50 in order to enable an external computer (not shown) to write personality data into or read personality data from microprocessor 50. Optionally, microprocessor 50 can be programmed to automatically read the personality data stored in programmable memory device 56 each time radio transceiver 10 is activated or turned on. Alternatively, as seen in dashed lines in FIG. 3, battery pack 30 may have a programmer connector 72 associated with programmable memory device 56 therein so that an external computer may directly write personality data into and read personality data from programmable memory device 56.

As stated previously herein, the personality data stored in programmable memory device 56 includes information specific to radio system 5, radio transceiver 10 and/or the user thereof. For example, information specific to radio transceiver 10 includes, but is not limited to, transceiver hardware information, data relating to transceiver constants, and information relating to a radio system of which transceiver 10 is a part. With respect to a specific user of radio transceiver 10, the personality data includes, but is not limited to, information representative of a user identification number, a group identification number, frequently called identification numbers, frequently called telephone numbers, and settings for user preference-type options on radio transceiver 10. In order to reduce the memory size required for programmable memory device 56, one option is to store only a portion or subset of the personality data specific to radio transceiver 10 therein.

In an alternative embodiment, radio transceiver 10 may also include a programmable memory device 74 located in housing interior space 68 which is connected to microprocessor 50. In this way, a portion of the personality data can be stored in transceiver programmable memory device 74 and a portion of the personality data stored in battery pack programmable memory device 56. This alternative configuration is depicted by the dashed box designated 74 in FIG. 3. Of course, the personality data may be split or apportioned between programmable memory devices 56 and 74 in a variety of ways, but it is preferred that the personality data specific to transceiver 10 be stored in programmable memory device 74 and the personality data specific to battery pack 30 or a user of radio transceiver 10 be stored in programmable memory device 56.

Figure 4:
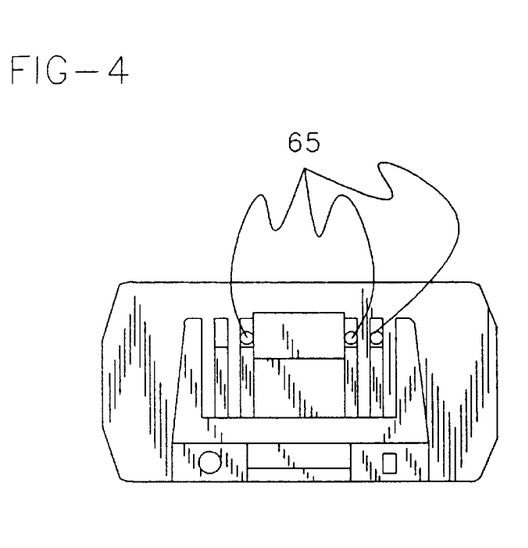
FIG. 4 is a top view of the battery pack depicted in FIG. 2.

It will also be seen from FIG. 4 that battery pack 30 preferably is a rechargeable unit, and therefore includes a circuit defined by the outline of box 76 having a plurality of resistors and diodes therein with a plurality of corresponding terminals 67 for receipt by an appropriate charging unit.

In accordance with the present invention, a system for storing personality data relating to a plurality of digitally controlled radio transceivers and users thereof is contemplated, where the system involves employing a separate and interchangeable battery pack 30 for each user to power any radio transceiver 10 of radio system 5 (see battery packs 30a-in FIG. 1). In this manner, programmable memory device 56 in battery pack 30 would need to be programmed initially, such as by an external computer, but would thereafter be retained by the user after completing use of radio transceiver 10. This would allow a plurality of users to utilize a single radio transceiver 10 without the necessity of constantly reprogramming the personality data therefor. Of course, compatible circuit means, such as serial data line 60 and serial clock line 62 described herein, would be required for radio transceiver 10 and programmable memory device 56 to be able to communicate information therebetween.

It will be noted that detachable battery packs are currently being utilized by radio transceivers and other communication devices. Thus, by incorporating a programmable memory device 56 in a battery pack 30, the personality data is able to remain independent of the radio transceiver's internal circuitry without altering the overall size of radio transceiver 10 or its existing requirements. Further, since a user merely retains a battery pack 30 containing the personality data specific to him and the radio transceiver 10 of radio system 5, the need for reprogramming of personality data is minimized and efficient sharing of radio transceiver 10 is available. Clearly, the cost of providing individual battery packs for a user is much less expensive than providing individual radio transceivers. Also, by embedding programmable memory device 56 in battery pack 30, radio transceiver 10 is not susceptible to weather or increased wear and tear.

Having shown and described the preferred embodiment of the present invention, further adaptations of battery pack 30 including programmable memory device 56 and radio transceiver 10 utilizing such battery pack 30 can be accomplished by appropriate modifications by one of ordinary skill in the art without departing from the scope of the invention. While the present invention has been described in relation to a radio system and the radio transceivers thereof, it will be understood that it can be practiced with other communication systems and devices which operate by a battery pack and require personality data or other codes to secure communications.

What is claimed is:

1. A battery pack for powering a radio transceiver, comprising:
   (a) a battery enclosure;
   (b) an electrical battery;
   (c) a programmable memory device having personality data stored s therein, said personality data identifying at least one of said radio transceiver and an authorized user of said radio transceiver so as to permit operation of said radio transceiver within a secure radio system; and
   (d) circuit means for transmitting said personality data to and from said programmable memory device;
wherein said electrical battery, said programmable memory device, and said circuit means are all permanently housed in said battery enclosure.

2. The battery pack of claim 1, wherein said programmable memory device is able to write personality data through said circuit means.

3. The battery pack of claim 1, wherein said programmable memory device is able to read personality data through said circuit means.

4. The battery pack of claim 1, further comprising a programmer connector connected to said programmable memory device, wherein said personality data is able to be written into or read from said programmable memory device through said programmer connector.

5. The battery pack of claim 1, said circuit means comprising a serial clock line and a serial data line, wherein said personality data is transmitted through said serial data line when synchronized with said serial clock line.

6. The battery pack of claim 1, wherein said programmable memory device has a non-volatile memory.

7. The battery pack of claim 1, wherein said electrical battery is rechargeable.

8. The battery pack of claim 1, further comprising a plurality of electrical contacts connected to said circuit means and said electrical battery on a first side and terminating along an outer surface of said battery enclosure on a second side, wherein said electrical contacts are able to transmit personality data to and from said circuit means and power from said electrical battery.

9. The battery pack of claim 1, further comprising means for attaching to and detaching from said radio transceiver.

10. The battery pack of claim 1, further comprising a device for regulating a supply voltage from said electrical battery to said programmable memory device.

11. A digitally controlled radio transceiver, comprising:
   (a) a housing defining an interior space and an outer surface;
   (b) a battery pack attached to said housing outer surface, said battery pack further comprising:
       (1) a battery enclosure;
       (2) an electrical battery;
       (3) a programmable memory device having personality data stored therein, said personality data identifying at least one of said radio transceiver and an authorized user of said radio transceiver so as to permit operation of said radio transceiver within a secure radio system, and
       (4) circuit means for transmitting said personality data to and from said programmable memory device, wherein said electrical battery, said programmable device, and said circuit means are all permanently housed in said battery enclosure;
   (c) RF circuitry disposed in said housing interior space for generating modulated RF signals for transmission and for receiving RF signals for demodulation; and
   (d) a microprocessor disposed in said housing interior space for operating said RF circuitry, said microprocessor including circuit means for transmitting and receiving said personality data;
wherein said circuit means of said microprocessor and said circuit means of said programmable memory device are connected, whereby said personality data is able to be transmitted between said microprocessor and said programmable memory device.

12. The radio transceiver of claim 11, wherein said microprocessor is able to write said personality data to said programmable memory device.

13. The radio transceiver of claim 11, wherein said microprocessor is able to read said personality data stored in said programmable memory device.

14. The radio transceiver of claim 11, said battery pack further comprising a programmer connector associated with said programmable memory device, wherein said personality data is able to be written into or read from said programmable memory device through said programmer connector.

15. The radio transceiver of claim 11, said radio transceiver further comprising a programmer connector associated with said microprocessor, wherein said personalty data is able to be written into or read from said microprocessor through said programmer connector.

16. The radio transceiver of claim 11, wherein said programmable memory device has a non-volatile memory.

17. The radio transceiver of claim 13, wherein said microprocessor automatically reads said personality data stored in said programmable memory device each time said radio transceiver is turned on.

18. The radio transceiver of claim 11, wherein only a subset of said personality data specific to said radio transceiver is stored in said programmable memory device.

19. The radio transceiver of claim 11, said circuit means of said microprocessor and said programmable memory device each further comprising a serial data line and a serial clock line, wherein said personality data is transmitted over said serial data line when synchronized with said serial clock line.

20. The radio transceiver of claim 19, said housing outer surface and said battery pack each including a plurality of electrical contacts in abutting relation for said electrical battery, said serial data line, and said serial clock line, wherein said electrical battery is able to power said transceiver and said personality data is able to be communicated between said microprocessor and said programmable memory device.

21. The radio transceiver of claim 11, said outer housing and said battery enclosure further comprising means for attaching said battery pack to and detaching said battery pack from said radio transceiver.

22. The radio transceiver of claim 11, further comprising a programmable memory device located in said transceiver housing inner space connected to said microprocessor, wherein a portion of said personality data is stored in said transceiver programmable memory device and a portion of said personality data is stored in said battery pack programmable memory device.

23. The radio transceiver of claim 22, wherein said personality data stored in said transceiver programmable memory device includes information specific to said transceiver.

24. The radio transceiver of claim 22, wherein said personality data stored in said battery pack programmable memory device includes information specific to said battery pack.

25. The radio transceiver of claim 24, wherein said personality data stored in said battery pack programmable memory device includes said personality information specific to a user of said radio transceiver.

26. A system for securing a communication system including a plurality of digitally controlled communication devices, said system comprising a plurality of interchangeable battery packs to power said communication devices, wherein each said battery pack includes a programmable memory device permanently housed therein having personality data identifying at least one of a communication device and an authorized user of said communication device so as to permit operation of said communication device within said communication system.

27. The system of claim 26, wherein said communication device is a radio transceiver.

28. A method of equipping a digitally controlled radio transceiver for operation in a secure radio system, said method comprising the steps of:

(a) providing an interchangeable battery pack for powering said transceiver;

(b) permanently incorporating a programmable memory device into said battery pack; and (c) storing personality data in said programmable memory device, said personality data identifying at least one of a radio transceiver and a user of said radio transceiver authorized to operate within said radio system.

29. The method of claim 28, said storing step further comprising the steps of:

(a) writing said personality data from a computer to a microprocessor in said transceiver;

(b) receiving said personality data in said microprocessor;

(c) writing said personality data from said microprocessor to said programmable memory device; and (d) storing said personality data in said programmable memory device.

30. The method of claim 28, said storing step further comprising the steps of:

(a) writing said personality data from a computer to a programmable connector associated with said programmable memory device; and (b) storing said personality data in said programmable memory device.

* * * * *